(12) United States Patent
Nett et al.

(10) Patent No.: US 8,398,523 B2
(45) Date of Patent: Mar. 19, 2013

(54) DRIVETRAIN FOR AN ALL-WHEEL-DRIVE VEHICLE, AND METHOD FOR CONTROLLING THE SAME

(75) Inventors: Hans-Peter Nett, Adenau (DE); Bernd Oberhausen, Cologne (DE); Michael Hoeck, Neunkirchen-Seelscheid (DE); Jan Haupt, Bergisch Gladbach (DE)

(73) Assignee: GETRAG Driveline Systems GmbH, Cologne (DE)

( * ) Notice: Subject to any disclaimer, the term of this patent is extended or adjusted under 35 U.S.C. 154(b) by 847 days.

(21) Appl. No.: 12/478,690

(22) Filed: Jun. 4, 2009

(65) Prior Publication Data
US 2009/0305839 A1 Dec. 10, 2009

(30) Foreign Application Priority Data
Jun. 5, 2008 (DE) .......................... 10 2008 027 672

(51) Int. Cl.
*F16H 3/56* (2006.01)
*F16H 37/08* (2006.01)
*B60K 17/34* (2006.01)
*B60K 23/08* (2006.01)

(52) U.S. Cl. ........ 475/295; 475/205; 475/338; 475/200; 180/248

(58) Field of Classification Search ............ 475/295, 475/205; 180/248
See application file for complete search history.

(56) References Cited

U.S. PATENT DOCUMENTS

| | | | |
|---|---|---|---|
| 4,829,849 A * | 5/1989 | Masuda et al. | 180/247 |
| 6,309,322 B1 | 10/2001 | Shim | |
| 6,612,959 B2 * | 9/2003 | Frost | 475/295 |
| 6,837,817 B2 * | 1/2005 | Mori et al. | 475/327 |
| 7,610,980 B2 * | 11/2009 | Mori | 180/233 |
| 2004/0106487 A1 | 6/2004 | Mori et al. | |
| 2008/0029328 A1 * | 2/2008 | Hoeck et al. | 180/248 |

FOREIGN PATENT DOCUMENTS

| | | |
|---|---|---|
| DE | 10 2007 018 619 A1 | 10/2008 |
| GB | 2230498 A | 10/1990 |
| WO | 03022615 A1 | 3/2003 |

(Continued)

OTHER PUBLICATIONS

International Search Report; Application No. EP 09 15 9985.

*Primary Examiner* — Justin Holmes
*Assistant Examiner* — Jacob S Scott
(74) *Attorney, Agent, or Firm* — Knobbe, Martens, Olson & Bear, LLP (57) ABSTRACT

A drivetrain for an all-wheel-drive vehicle which has a first driven axle and a second driven axle. A drive unit is connected to a multi-stage transmission which has a multiplicity of gear stages for generating different transmission ratios. A transmission output shaft of the multi-stage transmission is connected to the first driven axle. The drive unit is also connected to an activating arrangement, the output element of which is connected to the second driven axle. Thus drive power can be supplied to the first axle permanently via the multi-stage transmission and drive power can be supplied to the second axle on demand via the activating arrangement.

The activating arrangement has a first activating friction clutch and a second activating friction clutch which are designed to supply drive power to the second axle via a first and a second transmission ratio stage, respectively. The first transmission ratio stage is assigned to at least one lower gear stage of the multi-stage transmission. The second transmission ratio stage is assigned to at least one higher gear stage of the multi-stage transmission.

23 Claims, 4 Drawing Sheets

FOREIGN PATENT DOCUMENTS

| WO | 2005080117 A2 | 9/2005 |
| WO | 2006029684 A1 | 3/2006 |
| WO | WO 2006/100585 A1 | 9/2006 |
| WO | 2008120097 A1 | 10/2008 |

* cited by examiner

DRIVETRAIN FOR AN ALL-WHEEL-DRIVE VEHICLE, AND METHOD FOR CONTROLLING THE SAME

CROSS-REFERENCE OF RELATED APPLICATIONS

This application claims the priority of German patent application DE 10 2008 027 672, filed Jun. 5, 2008.

BACKGROUND OF THE INVENTION

The present invention relates to a drivetrain for an all-wheel-drive vehicle which has a first driven axle and a second driven axle, having a drive unit which is connected to a multi-stage transmission which has a multiplicity of gear stages for generating different transmission ratios, with a transmission output shaft of the multi-stage transmission being connected to the first driven axle, with the drive unit also being connected to an activating arrangement, the output element of which is connected to the second driven axle, such that drive power can be supplied to the first axle permanently via the multi-stage transmission and drive power can be supplied to the second axle on demand via the activating arrangement.

The present invention also relates to a method for controlling a drivetrain which has a drive unit which is connected firstly via a transmission to a first axle and secondly via an activating arrangement to a second axle.

In recent years, interest in all-wheel-drive motor vehicles has risen. Here, all-wheel drive is no longer used exclusively in off-road vehicles. The improved traction of all-wheel-drive drivetrains is also advantageous in normal road-going vehicles.

In general, in all-wheel-drive drivetrains, a distinction is made between clutch-controlled and differential-controlled systems. A differential-controlled system has a central longitudinal differential which receives drive power from a drive unit via a multi-stage transmission and distributes said power permanently between the two driven axles. In clutch-controlled all-wheel-drive drivetrains, it is generally the case that one axle is permanently driven and the second axle is activated on demand ("hang-on" systems).

In off-road vehicles, the second axle is often activated manually. In road-going vehicles, this generally takes place by means of an automatically closing clutch.

Here, use was made in the past of passive systems, such as for example a Visco clutch or a Haldex clutch. Said known systems often operate such that the clutch is closed in reaction to a rotational speed difference between the permanently driven axle and the non-permanently driven axle.

The introduction of ABS and ESB also places increased demands on all-wheel-drive systems. Active systems have therefore been developed which can be opened or closed at any time regardless of rotational speed differences. The so-called disturbance torques of passive systems are prevented in this way. In the active systems, use is often made of friction clutches. On account of the good controllability and the good wear behaviour, said friction clutches are often embodied as multiplate clutches, in particular as wet-running multiplate clutches.

All-wheel drive also has advantages, in particular with regard to the acceleration performance which can be obtained, in sporty motor vehicles in which a high power-to-weight ratio is important.

Conventional all-wheel-drive drivetrains, however, are afflicted with a relatively high overall weight.

Document WO 2006/100585 A1 discloses a drivetrain for a motor vehicle which is suitable for sporty vehicles. Here, a drive unit in the form of an internal combustion engine is connected via a multi-stage transmission having five, six or more gear stages to a first driven axle (the rear axle).

Furthermore, the output of the drive unit is connected to an activating ("hang-on") arrangement in the form of a single friction clutch whose output element is connected to the second driven axle. Here, the activating arrangement may, as one option, be connected to an output element of a starting and separating clutch which is arranged between the drive unit and the multi-stage transmission. It is alternatively also possible for the activating arrangement to be connected directly to an output shaft of the drive unit (for example the crankshaft of an internal combustion engine). This permits, for example, a layout in which the starting and separating clutch and also the multi-stage transmission are connected, on a first axial side, to the output shaft of the drive unit. In this embodiment, the activating arrangement is connected, on the other axial side, to the output shaft of the drive unit.

Here, the friction clutch which is used in the activating arrangement of the drivetrain of WO 2006/100585 A1 is connected via a transmission ratio stage to the second driven axle, in such a way that the rotational speed of the second driven axle corresponds to a certain gear stage of the multi-stage transmission, in particular the third gear stage, when the friction clutch of the activating arrangement is closed. In this way, all-wheel drive is possible only in said gear stage and in the lower gear stages (that is to say for example the second and first gear stages).

Furthermore, the output element of the activating arrangement of the drivetrain of WO 2006/100585 A1 is connected to a mechanical differential of the second driven axle. An input member of the activating arrangement may be connected via a spur gear set arrangement to the drive unit. Alternatively, an output element of the activating arrangement is connected via a spur gear set arrangement to an input element of the second driven axle. The transmission ratio of the spur gear set arrangement and the transmission ratio of the mechanical differential form the overall transmission ratio, which determines the individual gear stage to which the activating arrangement is assigned.

While the mechanical differential of the first driven axle may be embodied as a limited-slip differential, the differential of the second driven axle may be embodied as an "open" differential. It is also proposed in document WO 2006/100585 A1 to electronically control the percentage of the drive torque which is allocated to the second driven axle according to dynamic parameters of the motor vehicle.

BRIEF SUMMARY OF THE INVENTION

Against the above background, it is the object of the present invention to specify an improved drivetrain and an improved method for controlling a drivetrain.

The above object is achieved by a drivetrain for an all-wheel-drive vehicle which has a first driven axle and a second driven axle, having a drive unit which is connected to a multi-stage transmission which has a multiplicity of gear stages for generating different transmission ratios, with a transmission output shaft of the multi-stage transmission being connected to the first driven axle, with the drive unit also being connected to an activating arrangement, the output element of which is connected to the second driven axle, such that drive power can be supplied to the first axle permanently via the multi-stage transmission and drive power can be supplied to the second axle on demand via the activating arrangement, wherein the activating arrangement has a first activating friction clutch and a second activating friction clutch which are designed to supply drive power to the second axle via a first and a second transmission ratio stage respectively, with the first transmission ratio stage being assigned to at least one lower gear stage of the multi-stage transmission and with the second transmission ratio stage being assigned to at least one higher gear stage of the multi-stage transmission.

By means of said measure, it is possible firstly to carry out all-wheel-drive operation of the drivetrain over a greater spread range of the multi-stage transmission, in particular in the lower gears and up to the higher gear stage of the multi-stage transmission. Furthermore, the slip between an input element of a respectively active activating friction clutch and the output element can be reduced. In this way, the power loss can be reduced considerably. This permits longer actuation times of the activating arrangement.

Overall, it is therefore if appropriate also possible for higher torques to be transmitted.

The drive unit may, in the present case, be a combination of an engine and a starting and separating clutch. In the present case, however, the drive unit preferably does not comprise a starting and separating clutch of said type.

The object is thereby achieved in its entirety.

It is particularly preferable here if the activating arrangement has a planetary gear set arrangement for generating the first and the second transmission ratio stages.

By using a planetary gear set arrangement, it is possible to generate a comparatively large spread between the first and second transmission ratio stages in a relatively small installation space.

Here, it is also advantageous if the planetary gear set arrangement has a Ravigneaux-type planetary gear set arrangement with a first and a second planetary gear set which are arranged axially adjacent to one another.

A Ravigneaux-type planetary gear set arrangement is to be understood in particular to mean a planetary gear set arrangement in which at least two elements of the two planetary gear sets are rigidly connected to one another.

Here, it is preferable if the planetary gear sets have a common planet carrier.

It is thereby possible to realize, overall, a particularly compact trans-mission ratio unit, by means of which the first and second transmission ratio stages can be generated with a wide spread range.

According to a further preferred embodiment, the common planet carrier is connected to the output element of the activating arrangement, which is connected to the second axle.

The installation space in particular in the axial direction can be further shortened in this way.

It is also preferable if the first planetary gear set has a sun gear which is connected to an input shaft of the activating arrangement.

This leads to a coaxial arrangement of the first planetary gear set with respect to the input shaft, and consequently to a radially compact design.

According to a further preferred embodiment, the second planetary gear set has a sun gear which can be connected via the first activating friction clutch to an input shaft of the activating arrangement.

In this way, the first activating friction clutch can be integrated with the planetary gear sets in a structurally simple manner. The sun gear of the second planetary gear set is preferably likewise arranged concentrically with respect to the input shaft.

It is also preferable if the second planetary gear set has a sun gear which can be connected via the second activating friction clutch to a housing of the activating arrangement.

Said embodiment permits a structural simplification with regard to the integration of the second activating friction clutch into the activating arrangement.

In the present case, a housing is to be understood to mean any component which is fixedly connected to a component on which the input shaft and/or the output element of the activating arrangement are mounted.

It is also advantageous if the sun gear of the second planetary gear set is mounted on a hollow shaft section on the input shaft of the activating arrangement.

This permits an axially compact design. Here, the second planetary gear set may be arranged between an input of the activating arrangement and the first planetary gear set, such that the first and/or the second activating friction clutch may be arranged in a structurally preferable manner between the second planetary gear set and a housing section of the activating arrangement.

Overall, it is advantageous if the first planetary gear set has a sun gear, an internal gear, a multiplicity of planets which are mounted on a planet carrier and which are in engagement with the sun gear, and a multiplicity of stepped planets which are in engagement with the planets and with the internal gear.

In said embodiment of the first planetary gear set, it is possible to obtain a high transmission ratio in an axially compact space.

Here, it is advantageous if the internal gear of the first planetary gear set can be connected via a third activating friction clutch to a housing of the activating arrangement.

In said embodiment, it is possible by means of the third activating friction clutch to obtain a rotational direction reversal at the output element of the activating arrangement. Here, it may consequently be obtained that all-wheel-drive operation is possible even in the reverse gear.

In general, a third activating friction clutch of said type to realize a reverse gear may also be integrated in the activating arrangement in any other desired way. Here, a third transmission ratio stage is preferably generated by means of the third activating friction clutch, which third transmission ratio stage is matched to the transmission ratio of the reverse gear in the multi-stage transmission. The third transmission ratio stage should therefore be designed such that the third activating friction clutch can be operated in the closed state, or in the slipping state, during reverse driving.

According to a further preferred embodiment, the second planetary gear set has a sun gear and a multiplicity of planets which are mounted on a planet carrier.

In said embodiment, it is preferable that the second planetary gear set need not have an internal gear, such that space for the third activating friction clutch and/or an associated actuator arrangement is provided radially outside the second planetary gear set.

It is likewise advantageous if the stepped planets of the first planetary gear set and the planets of the second planetary gear set are connected to one another.

It is possible in this way to realize a large spread between the first and second transmission ratio stages. Furthermore, the rotational direction reversal can be realized in a structurally expedient manner with a small axial installation space requirement.

Overall, it is advantageous if the first and the second activating friction clutches are designed so as to be nested radially one inside the other.

The axial installation space requirement can be further minimized in this way. Furthermore, it is advantageous, as mentioned above, if the friction clutches are arranged in the axial direction between the second planetary gear set and an input-side wall of a housing of the activating arrangement.

A further preferred embodiment provides, as is likewise mentioned above, that the activating arrangement has a third activating friction clutch which is designed to supply drive power to the second axle in the opposite rotational direction.

It is also advantageous if an input shaft of the activating arrangement is connected via a damping arrangement to the drive unit in a positively locking fashion.

By means of the damping arrangement, it is possible for vibrations which are generated by the drive unit at the input of the activating arrangement to be damped. Furthermore, it is possible in this way for imbalances of one or more of the activating friction clutches to be compensated, which imbalances could otherwise be corrected only by means of very close tolerances or a balancing procedure during production.

Here, it is advantageous if the damping arrangement has a claw clutch with integrated damper means.

It is possible firstly to ensure the positively locking connection between the drive unit and the activating arrangement in this way. A compact design can be realized by means of the integrated damper means.

It is also particularly preferable if the claw clutch is permanently closed.

It is duly generally conceivable for the claw clutch to be designed as a separating clutch. Influences of the drive unit on the activating arrangement during purely two-wheel-drive operation could be prevented completely in this way. However, the claw clutch is preferably permanently closed, and drive influences of the drive unit are damped by the damping means (for example in the form of one or more elastomer damper elements).

According to a further preferred embodiment, the activating arrangement has a housing which has an input shaft, the activating friction clutches, a planetary gear set arrangement and the output element which is arranged concentrically with respect to the input shaft.

It is possible to realize a radially and axially compact activating arrangement overall in this way.

According to a further preferred embodiment, the housing also holds a device for distributing the power which is supplied via the activating arrangement to the second axle between the two wheels of the second axle.

In this way, it is possible for the activating device to be combined with a power distributing device of said type, such that the drive of the second axle can be realized by means of a compact device which can be integrated into the drivetrain in a simple manner. The device for distributing the drive power between the two wheels of the second axle may generally be designed here as a conventional mechanical differential.

It is however particularly preferable if the second driven axle has a first axle friction clutch and a second axle friction clutch which have a common input element and whose output elements are connected in each case to a driveshaft for a left-hand wheel and a right-hand wheel of the second axle, with it being possible for the first and the second axle friction clutches to be controlled independently of one another.

Said embodiment is considered to be a separate invention independently of the embodiment of the activating arrangement, that is to say even in combination with activating arrangements which have only a single activating friction clutch.

The particular advantage of said embodiment is that a so-called active yaw system can be generated in a very expedient manner in this way, which active yaw system makes it possible to distribute torque between the drive wheels in a targeted fashion when driving around a curve in order to improve the driving dynamics. It is also possible by means of a concept of said type to realize a transverse lock on the second axle.

Active yaw systems (also referred to as torque vectoring systems) permit the targeted allocation of drive torque to the wheels of an axle, such that, on account of the different wheel tangential forces, a yaw moment acts about the vehicle vertical axis. In connection with an electronic driving dynamics regulating system which detects the present driving situation by means of corresponding sensors, it is possible in a targeted fashion to generate, or even prevent, oversteering or understeering of the driving behaviour.

While ESP systems can generate the yaw moment about the vehicle vertical axis by virtue of individual wheels being braked in a targeted fashion, in an active yaw system, drive torque is distributed between the wheels of an axle in a targeted fashion. Accordingly, the influencing of the torque can lead to a considerable improvement in the driving dynamics in order to ultimately increase driving pleasure specifically in sporty vehicles.

Here, it is self-evident that, when the active yaw system is not capable of generating a certain driving behaviour by exerting targeted influence on the axle friction clutches, an ESP system may be used, like before, as a secondary solution.

It is duly generally possible to provide an axle gearing of said type, which has a first axle friction clutch and a second axle friction clutch, in such a way that each friction clutch is assigned a transmission ratio stage. Such systems have already been used for some time, for example by the company Honda under the name SH-AWD.

In the present case, however, it is particularly preferable if the axle gearing has only one angle drive, having a ring gear which is connected to an input element of the two axle friction clutches. Here, the output elements of the two axle friction clutches are connected in each case directly to the respective driveshafts.

In such an embodiment, an active yaw concept may be realized with little structural expenditure and with a low weight.

Here, it is particularly preferable if the two axle friction clutches are arranged on the same side, in the axle direction, in relation to such an angle drive which connects the second axle to the activating arrangement.

In this way, the axle friction clutches and their actuating arrangements can be of compact design.

Here, it is likewise advantageous if the common input element is a common plate carrier, with the axle friction clutches being embodied as multiplate clutches, in particular as wet-running multiplate clutches.

According to a further preferred embodiment, the transmission ratios which are generated firstly by means of the activating friction clutches and secondly by means of the respectively associated gear stage of the multi-stage transmission are selected such that the rotational speed of the front axle is 5% to 15% higher than a reference rotational speed.

By means of said embodiment, it is possible even in tight curves to still generate positive drive torque via the wheel at the outside of the curve.

Here, the rotational speed difference may be generated in a comparatively simple manner by means of the transmission ratio stages of the activating arrangement.

Furthermore, a rotational speed difference of said type can also be generated in a comparatively simple manner in many situations (even if the trans-mission ratio stages of the activating arrangement are not configured correspondingly)

since the activating friction clutches are operated with slip in many driving situations in any case, such that, by means of suitable activation, it is if appropriate possible to generate a higher rotational speed on the output side of the activating friction clutch in relation to the rear axle.

The reference rotational speed may be a mean wheel speed of all the wheels of the vehicle, though may for example also be the rotational speed of the wheels of the rear axle.

According to the invention, the above object is also achieved by means of a method for controlling a drivetrain which has a drive unit which is connected firstly via a multi-stage transmission to a first axle and secondly via an activating arrangement to a second axle, in particular according to one of the above-described embodiments, having the steps:

detecting whether a gear stage which permits all-wheel-drive operation of the drivetrain is selected in the multi-stage transmission;

detecting whether a rotational speed difference is present or impending between the first and second axles;

implementing all-wheel-drive operation by actuating one of at least two activating friction clutches of the activating arrangement, specifically that activating friction clutch which is assigned to the selected gear stage, with the activating friction clutch being operated in such a state that the rotational speed generated by the drivetrain at the front axle is greater than or equal to the rotational speed of the rear axle; and     actuating at least one of two axle friction clutches on the second axle which are assigned to a left-hand wheel and to a right-hand wheel respectively of the second axle.

By means of the measure of generating a rotational speed which is greater than or equal to the rotational speed of the rear axle or some other reference rotational speed when implementing all-wheel-drive operation, it may be achieved that, when driving around a curve, the larger curve radius of the front axle, in particular of the wheel at the outside of the curve, can be compensated. In other words, drive torque with the correct rotational speed can be conducted to that wheel of the second axle which is at the outside of the curve, in order to thereby actively influence the yaw behaviour of the vehicle, even in tight curves.

Overall, it is self-evident that the present invention can be applied to virtually any type of drivetrain of a motor vehicle, for example to vehicles with a mid-engine layout which are permanently driven at the rear axle and in which the front axle is activated on demand by means of an activating arrangement. The invention is preferably used in drivetrains in which the drive unit is installed longitudinally. Here, it is preferably possible for drive power to be picked off from the drive unit on one axial side for the first axle and on the other axial side for the second axle.

However, it is generally also possible for the drive power to be picked off on the same axial side of the drive unit, and for the drive power to be branched off to the second axle upstream or downstream of a starting or separating clutch, at any rate upstream of an input of the multi-stage transmission. The drive unit may for example also be arranged at the front of the vehicle or at the rear of the vehicle.

Furthermore, it is generally possible not only to equip the axle gearing of the second axle with two axle friction clutches which can be actuated independently of one another. It is generally also conceivable to provide a similar axle friction clutch arrangement on the first axle, even though it is of course also possible to provide a conventional axle differential gearing there.

Overall, it is possible with the present invention in its various embodiments to obtain at least one of the following advantages: it is firstly possible to obtain relatively low power losses during the actuation of the activating friction clutches and/or the actuation of the axle friction clutches. It is also possible to obtain longer actuating times for the activating friction clutches and/or the axle friction clutches. At the second axle, it is possible to realize better utilization of the traction capability under all roadway conditions. Furthermore, it is possible to realize enhanced functionality of the drivetrain, in particular with an active yaw arrangement at the second axle.

When using the two axle friction clutches, the power loss per clutch is approximately halved by the introduction of the second clutch, which in turn permits longer actuating times. Furthermore, the utilization of the full traction potential of the secondary axle is possible independently of different traction potentials between the left and right sides. It is also possible to generate a transversely locked state when both axle friction clutches are actuated.

Furthermore, on account of the at least intermittent allocation of drive power to the second axle, the multi-stage transmission is preserved to a corresponding extent. The multi-stage transmission may therefore be dimensioned to be smaller if appropriate.

As a result of the use of two different transmission ratio stages in the activating arrangement, the slip in the activating friction clutches can be reduced. The power loss can be considerably reduced in this way. This permits longer actuating times of the activating arrangement.

Since, in the preferred embodiment of the two axle friction clutches, the input element of the axle friction clutches rotates at least approximately at the level of the rotational speeds at the second axle, imbalance-related tolerances can be made more generous.

By means of the Ravigneaux-type planetary gear set arrangement paired with the two activating friction clutches, it is possible to realize a neutral position, two forward gears and a reverse gear in a structurally very small installation space.

It is self-evident that the activating friction clutches and/or the axle friction clutches are controlled electronically. The actuators which are used for this purpose may be electromagnetic or electromechanical actuators, though may be embodied in particular as electrically actuated hydraulic actuators. The electrical signals required for this purpose are generated by a control unit and are prepared by means of power stages.

Since the activating arrangement permits a neutral position when the activating friction clutches are not actuated, the output side of the activating arrangement can be substantially decoupled from the drive side. In this way, mass inertias in the drivetrain can be reduced in two-wheel-drive operation. This may also lead to a reduction in $CO_2$ emissions, since fewer components need to rotate.

It is self-evident that it is also possible for three or more activating friction clutches to be provided in the activating arrangement instead of two activating friction clutches. The use of precisely two activating friction clutches is duly considered to be the optimum solution at the present time, since it is firstly possible to obtain a comparatively large spread and the assignment to two different gear stages of the multi-stage transmission. However, in the event of the provision of more installation space and the possibility of transporting a higher weight, it is also possible to provide more activating friction clutches, which are then assigned to in each case different gear stages of the multi-stage transmission. Here, the slip required in each case during operation of the activating arrangement in other gear stages of the multi-stage transmission could be considerably reduced.

The drive unit may be a conventional internal combustion engine. The drive unit may however also be embodied as a hybrid drive unit or even as a purely electric motor. For this purpose, the multi-stage transmission should be capable of adapting the rotational speed range of the engine to the driving speed range of the vehicle. Modern multi-stage transmissions have five, six, seven or more gear stages. A comparatively large spread is realized by means of said gear stages. The multi-stage transmission may be an all-wheel-drive transmission such as a manual shift transmission, an automated shift transmission or a dual-clutch transmission. The multi-stage transmission may however also be an automatic transmission such as a torque-converter transmission. Furthermore, however, it is also conceivable, instead of a multi-stage transmission, to provide a continuously variable transmission which has at least a comparable spread (such as for example a CVT transmission or a toroidal transmission). In the present case, therefore, the expression "multi-stage transmission" is to be understood broadly and also comprises transmissions which can generate an infinite number of "gear stages", that is to say also continuously variable transmissions.

It is self-evident that the features specified above and the features yet to be explained below can be used not only in the respectively specified combination but rather also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description, in which.

DETAILED DESCRIPTION OF THE INVENTION

Figure 1:
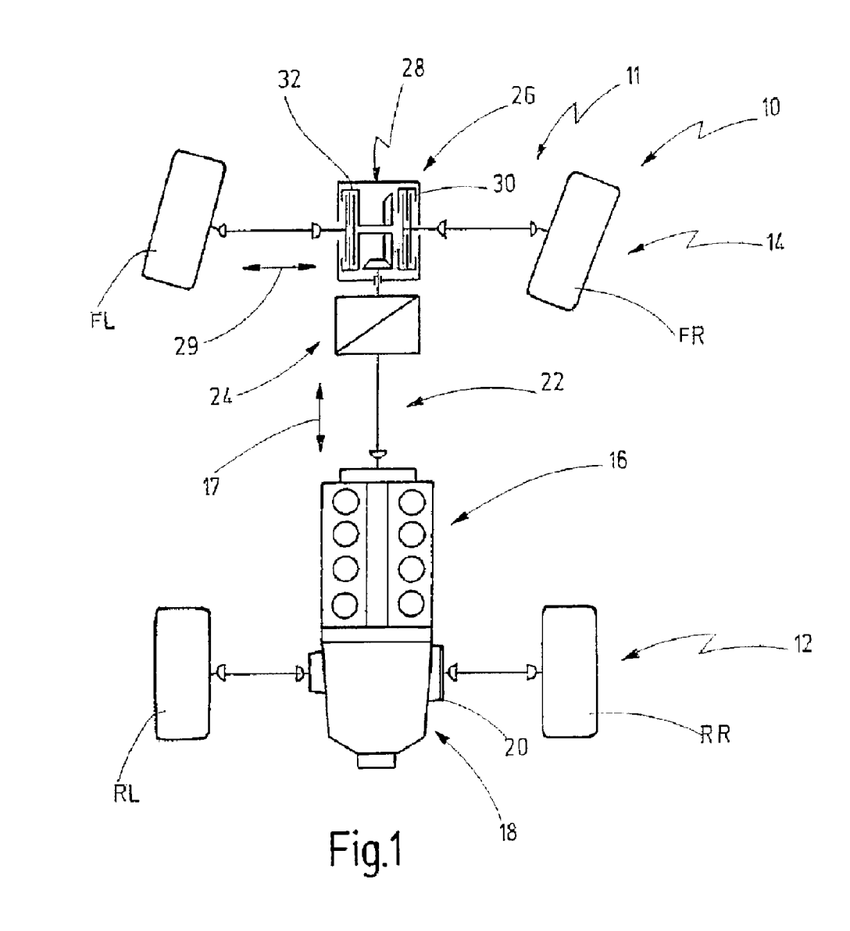
FIG. 1 shows a schematic plan view of a vehicle having a drivetrain according to one embodiment of the present invention.

In FIG. 1, in a schematic plan view, a motor vehicle is denoted generally by 10. The motor vehicle 10 may for example be designed as a sporty vehicle and has a drivetrain 11.

The drivetrain 11 comprises a first driven axle 12 and a second driven axle 14. In the present case, the first driven axle 12 is the rear axle, which has two wheels RL, RR. The wheels of the second driven axle 14 are denoted by FL, FR.

The drivetrain 11 also has a drive unit 16 which is installed in the motor vehicle in the longitudinal direction 17, specifically between the first axle 12 and the second axle 14. In said embodiment, the vehicle 10 is embodied as a mid-engined vehicle.

The drive unit 16 is connected, at its rear longitudinal end, to a multi-stage transmission 18. The multi-stage transmission 18 is consequently situated behind the drive unit 16 in the drive direction. The multi-stage transmission 18 may for example have five, six, seven, eight or more gear stages and may be embodied as a manual shift transmission, as an automatic shift transmission or as a dual-clutch transmission. Here, at least one starting and separating clutch (not shown in any more detail) is provided between the drive unit 16 and the transmission 18. An embodiment as a torque-converter transmission is also generally conceivable. It is generally also possible to use a continuously variable transmission, such as a CVT transmission or a toroidal transmission, etc., instead of a multi-stage transmission 18. In any case, the transmission 18 should have a relatively large spread in order to be able to realize high acceleration values and high maximum speeds for the sporty character of the vehicle 10.

A cardan shaft 22 is connected to a front end of the drive unit 16, which cardan shaft 22 is connected to an activating arrangement 24. The cardan shaft 22 may for example be connected directly to the crankshaft of the drive unit 16.

The activating arrangement 24 is designed to implement, in certain driving situations, all-wheel-drive operation in which drive power is conducted from the drive unit 16 via the cardan shaft 22 and the activating arrangement 24 to an axle gearing 26 of the second driven axle 14.

The axle gearing 26 may be a conventional differential gearing, but in the present case is embodied as a twin-clutch unit. The axle gearing 26 comprises an angle drive 28, by means of which the drive power is redirected from the activating arrangement 24 in the transverse direction 29 of the vehicle 10. The axle gearing 26 also comprises a first axle friction clutch 30 and a second axle friction clutch 32. The two axle friction clutches 30, 32 have a common input element which is connected to the angle drive 28. The output element of the first axle friction clutch 30 is connected to the right-hand front wheel FR. The output element of the second axle friction clutch 32 is connected to the left-hand front wheel FL. The connection takes place in each case via driveshafts (not shown in any more detail).

The two axle friction clutches 30, 32 can be controlled independently of one another. An electronic control unit which is used for this purpose is not illustrated in FIG. 1 for clarity. Furthermore, the two axle friction clutches 30, 32 are preferably embodied as wet-running multiplate clutches. Since the axle friction clutches 30, 32 are operated predominantly in slip as required, it is consequently possible for the power losses generated in this way to be dissipated via the fluid (oil). It is self-evident that an electric oil pump is preferably provided for this purpose, which electric oil pump is however not illustrated in FIG. 1. Furthermore, an oil cooler may be provided which is likewise not illustrated in FIG. 1 for clarity.

The general mode of operation of said drivetrain is as follows. Drive power is output permanently to the multi-stage transmission 18, such that the first driven axle 12 is permanently driven.

The second driven axle 14 is driven on demand. For this purpose, at least one friction clutch is provided in the activating arrangement 24, which friction clutch is actuated automatically by an electronic control unit in order to activate the second axle 14 on demand. This may for example take place if a rotational speed difference is present or impending between the first and second axles 12, 14.

Here, the activating friction clutch in the activating arrangement 24 is assigned to a certain gear stage of the multi-stage transmission 18 (or to a certain transmission ratio of the transmission 18). If the transmission 18 is operated in said gear stage, the activating arrangement 24 can be fully closed such that the first axle 12 and the second axle 14 are driven at the same speed or the same rotational speed.

If a gear stage below the predetermined gear stage is selected, it is then necessary on account of the higher rotational speed to operate the activating friction clutch 24 in the slipping state. It is alternatively or additionally possible to operate the two axle friction clutches 30, 32 in the slipping state in order to prevent distortion of the drivetrain.

In said layout of the drivetrain 11, all-wheel-drive operation is not possible in gear stages above the predetermined gear stage.

In one embodiment, the predetermined gear stage is for example the third gear stage, such that all-wheel-drive operation is possible in gear stages 1, 2 and 3. In contrast, only two-wheel-drive operation by means of the first driven axle 12 is possible in gear stages 4 and above.

As a result of the embodiment of the axle gearing 26 with a twin clutch 30, 32, it is also possible to distribute the drive power to the two wheels of the second axle 14 on demand. For example, when driving around a curve to the right, more drive power or torque can be allocated to the wheel at the outside of the curve (in this case, therefore, the left front wheel FL) than to the wheel at the inside of the curve, in order to enhance the turn-in behaviour of the vehicle 10 into the curve. By evaluating signals regarding the state of the vehicle 10, it is also possible to influence movements of the vehicle about the vertical axis (about the yaw axis) during driving, that is to say to generate or compensate understeer or oversteer in a targeted fashion. Here, it is self-evident that it is additionally possible to influence the yaw behaviour by means of an ESP system.

Further preferred embodiments of drivetrains according to the invention are illustrated below. Said embodiments generally correspond with regard to their design and mode of operation to the drivetrain 11 of FIG. 1. Only the differences are explained below.

Figure 1A:
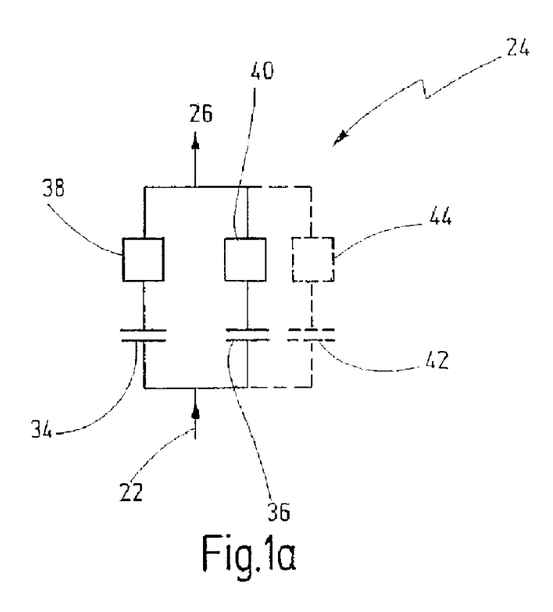
FIG. 1a shows a schematic illustration of an activating arrangement of the drivetrain of FIG. 1.

FIG. 1a shows a schematic illustration of a preferred embodiment of an activating arrangement 24.

The activating arrangement 24 has a first activating friction clutch 34 and a second activating friction clutch 36. The first activating friction clutch 34 is assigned a first transmission ratio stage 38. The second activating friction clutch 36 is assigned a second transmission ratio stage 40.

In said embodiment, the activating arrangement 24 is consequently of two-stage design. The first activating friction clutch 34 with the first transmission ratio stage 38 can be assigned to a first gear stage of the multi-stage transmission 18 (for example the second gear stage). The second activating friction clutch 36 with the second transmission ratio stage 40 can be assigned to a further gear stage of the multi-stage transmission 18 (for example the fourth gear stage).

The activating friction clutches 34, 36 are actuated alternately. If all-wheel-drive operation is to be implemented while the multi-stage transmission 18 is in gear stages 1 or 2, the first activating friction clutch 34 is actuated. If all-wheel-drive operation is required in gear stages 3 and 4 of the multi-stage transmission 18, the second activating friction clutch 36 is actuated. As a result of the two-stage design of the activating arrangement 24, the slip in the activating friction clutches 34, 36 can be reduced, such that the power loss can be reduced considerably. Furthermore, longer actuating times are possible in this way, such that all-wheel-drive operation is possible over longer time periods.

FIG. 1a also shows, illustrated by dashed lines, a third activating friction clutch 42 with an assigned third transmission ratio stage 44. The third activating friction clutch 42 is optional and may for example be assigned to a reverse gear stage of the multi-stage transmission 18. All-wheel-drive operation may consequently also be implemented during reverse driving of the motor vehicle 10.

Figure 2:
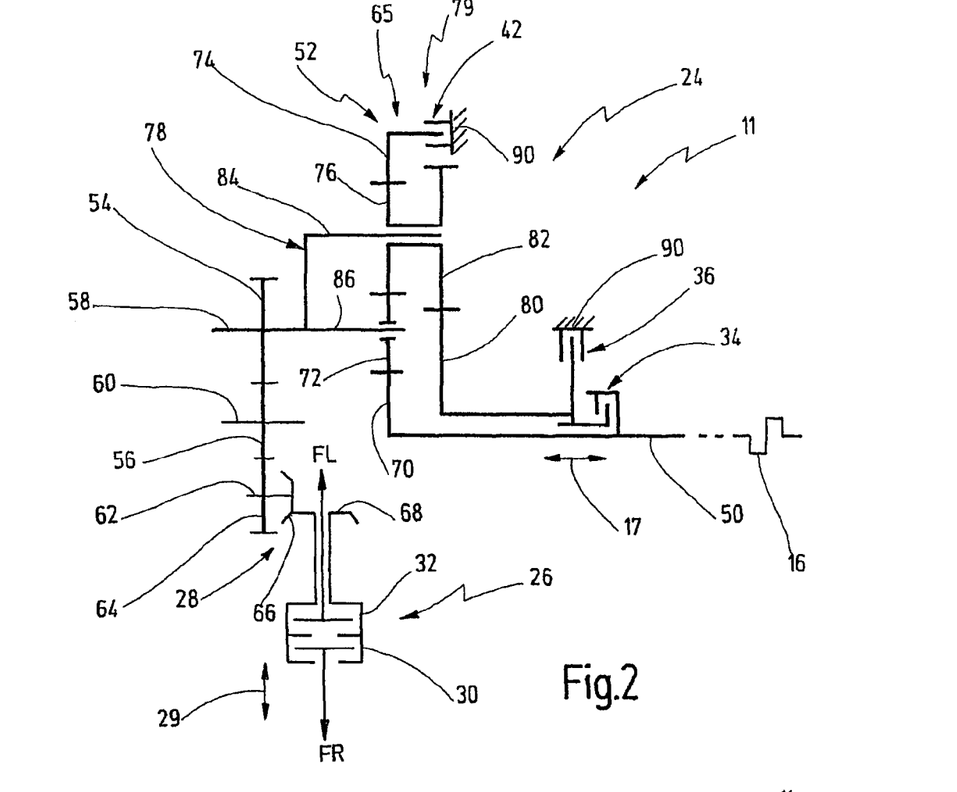
FIG. 2 shows a schematic transmission diagram of an exemplary activating arrangement and of an axle gearing of a drivetrain according to the invention.
Figure 3:
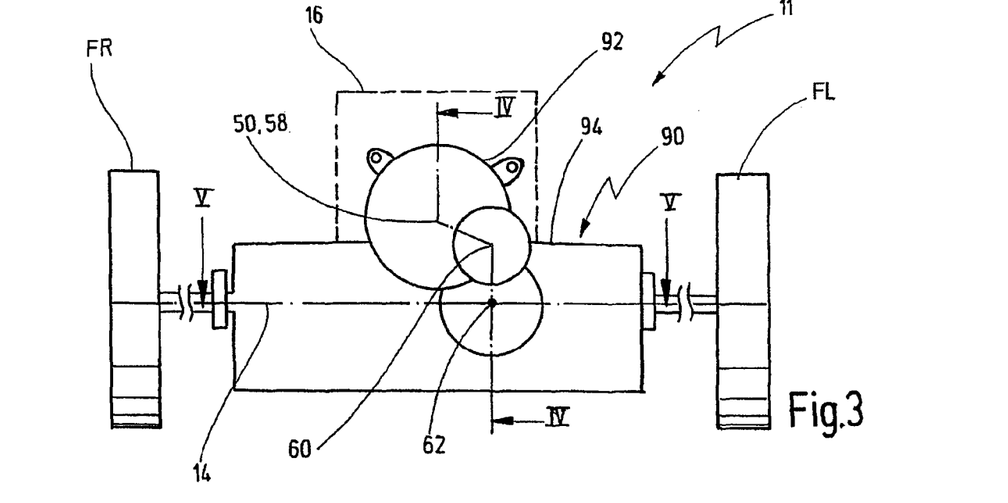
FIG. 3 shows a schematic view of an embodiment of a drivetrain according to the invention from the front.
Figure 4:
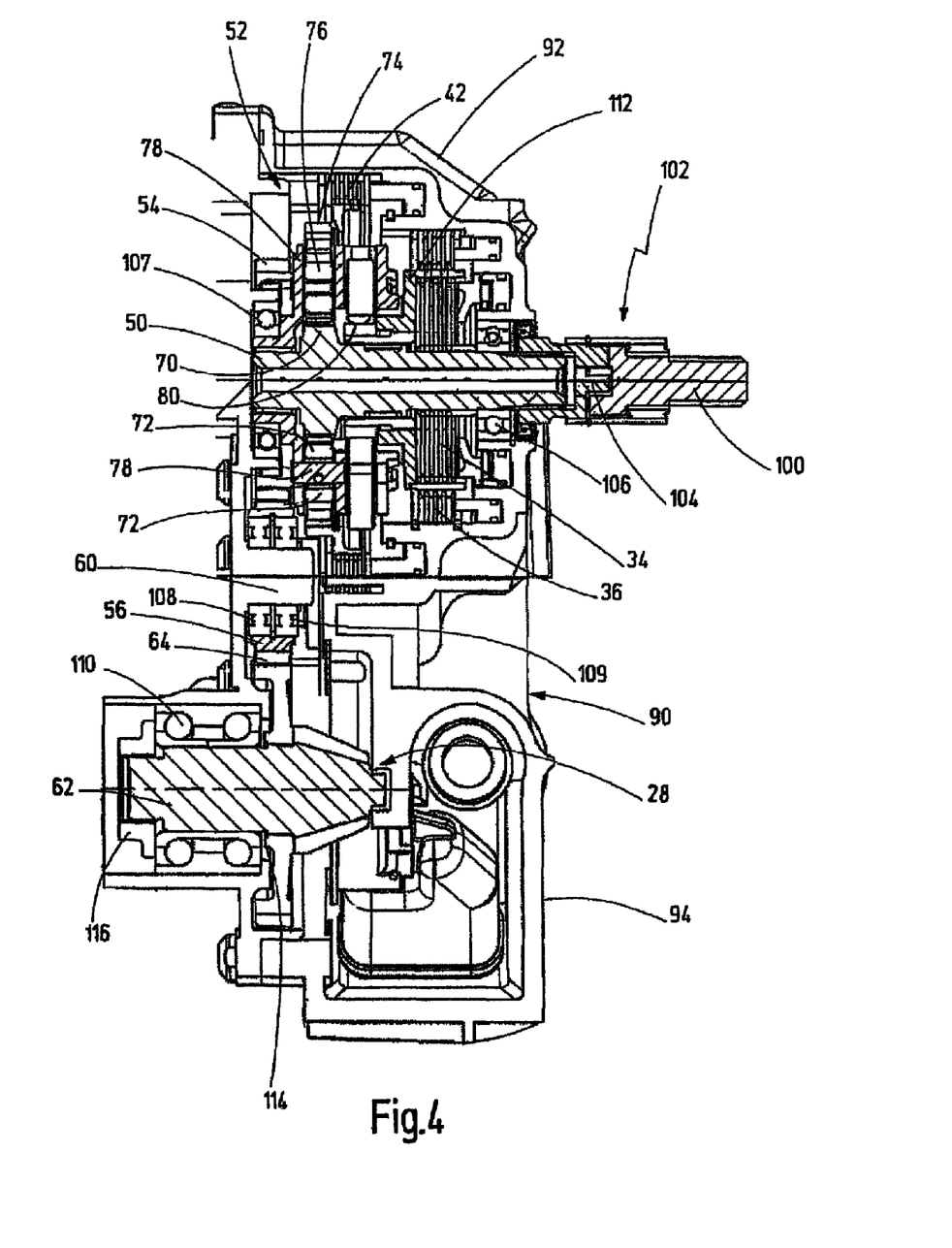
FIG. 4 shows a sectioned view along the line IV-IV in FIG. 3.

The following FIGS. 2 to 4 illustrate a preferred embodiment of a two-stage activating arrangement 24 of said type.

FIG. 2 shows that the activating arrangement 24 has an input shaft 50 which is rotationally fixedly connected to a drive output shaft of the drive unit 16. The activating arrangement 24 has a Ravigneaux-type planetary gear set arrangement 52 which is connected to the input shaft 50. Furthermore, the activating arrangement 24 has an output element 54. Said output element 54 is illustrated radially offset with respect to the input shaft 50 in the schematic illustration of FIG. 2. However, the output element 54 is preferably arranged concentrically with respect to said input shaft 50. The output element 54 is fixed to an output shaft 58 of the activating arrangement 24 and is in engagement with an intermediate gear 56 which is fixed to an intermediate shaft 60.

The intermediate gear 56 is in engagement with an angle drive spur gear 64 of the angle drive 28, which angle drive spur gear 64 is fixed to an angle drive shaft 62 which is aligned parallel to the output shaft 58 and the intermediate shaft 60.

The angle drive 28 also comprises a pinion 66 which is fixed to the angle drive shaft 62 and which is in engagement with a ring gear 68. The ring gear 68 is mounted so as to be rotatable about a rotational axis which is aligned parallel to the transverse direction 29. The ring gear 68 forms an input element for the two axle friction clutches 30, 32 or is rigidly connected to an input element.

The planetary gear set arrangement 52 comprises a first planetary gear set 65. The first planetary gear set 65 comprises a sun gear 70 which is rotation-ally fixedly connected to the input shaft 50 of the activating arrangement 24. Furthermore, the first planetary gear set 65 has a multiplicity of planets 72 which are rotatably mounted on a planet carrier 78. A further multiplicity of stepped planets 76 are arranged radially outside the planets 72 and are in engagement firstly with the planets 72 and secondly with an internal gear 74 of the first planetary gear set 65. The stepped planets 76 are likewise rotatably mounted on the planet carrier 78.

The planet carrier 78 is rotationally fixedly connected to the output shaft 58.

The planetary gear set arrangement 52 also has a second planetary gear set 79 whose sun gear 80 is mounted on a hollow shaft section about the input shaft 50. The second planetary gear set 79 also comprises a multiplicity of planets 82 which are in engagement with the sun gear 80. The planets 82 are rigidly connected to the stepped planets 76. The planets 82 with the stepped planets 76 are rotatably mounted on first bearing pins 84 of the planet carrier 78. The planets 72 of the first planetary gear set 65 are rotatably mounted on bearing pins 86, which are arranged offset and parallel with respect thereto, of the planet carrier 78.

The activating arrangement 24 also has the first activating friction clutch 34 which is designed to connect the input shaft 50 to the sun gear 80 of the second planetary gear set 79. Furthermore, the activating arrangement 24 comprises the second activating friction clutch 36 which is designed to connect the sun gear 80 of the second planetary gear set 79 to a housing of the activating arrangement 24. Finally, the activating arrangement 24 comprises the third activating friction clutch 42 which is designed to connect the internal gear 74 of the first planetary gear set 65 to the housing 90.

The following statements can be made with regard to the mode of operation of the activating arrangement 24. A neutral position is formed when the three activating friction clutches 34, 36, 42 are open. In said state, no appreciable torque is built up via the planetary gear set arrangement 52, such that the motor vehicle 10 drives substantially in the two-wheel-drive mode.

If the first activating friction clutch 34 is actuated, the two sun gears 70, 80 of the two planetary gear sets 65, 79 are blocked with respect to one another. In this way, a transmission ratio of i=1 is generated. The transmission ratio corresponding to the second gear stage is then generated by the gear set arrangement of the output element 54, the intermediate gear 56 and the angle drive 28.

If, alternatively, the second activating friction clutch 36 is actuated, which second activating friction clutch acts as a brake on the sun gear 80 of the second planetary gear set 79, a transmission ratio is realized which is selected such that, together with the spur gear set arrangement 54, 56, 28, an overall transmission ratio which corresponds to the fourth gear stage of the multi-stage transmission 18 is generated in the direction of the second driven axle 14.

By means of the selection of the numbers of teeth in the planetary gear set arrangement 52, said second transmission ratio can be selected in a wide range. Therefore, with the same gear set design, it is also possible for other gear stages of the multi-stage transmission 18 to be allocated to the first and second activating friction clutches 34, 36 rather than the gear stages two and four mentioned above by way of example.

The third activating friction clutch 42 is likewise designed as a brake for fixing the internal gear 74 with respect to the housing 90. In this way, a reverse gear is generated. Here, too, the transmission ratio can be selected in a relatively wide range as a result of the selection of the numbers of teeth.

If at least two of the activating friction clutches 34, 36, 42 are actuated, the planetary gear set arrangement 52 is fixed with respect to the housing 90 (similarly to a parking lock).

The activating friction clutches 34, 36, 42 are preferably embodied as multiplate clutches, in particular as wet-running multiplate clutches.

With the three activating friction clutches 34, 36, 42, it is consequently possible to generate five states, as described above.

FIG. 3 shows a schematic view of the drivetrain 11 from the front. The drive unit 16 can be seen in the background. The housing 90 has a first partial housing 92, which is assigned to the activating arrangement 24, and a second partial housing 94 which is assigned to the axle gearing 20. The partial housings 92, 94 may be connected to one another. Furthermore, it is also possible for the oil supply for the respective friction clutches 34, 36, 42 and 30, 32 to take place from a common oil sump which is preferably formed in the second partial housing 94 which is situated lower down.

The first partial housing 92 has a section which is substantially concentric with respect to the input shaft 50, which in turn is preferably aligned concentrically with respect to a drive output shaft of the drive unit 16. Furthermore, the first partial housing 92 has a section in which the intermediate gear 56 is held, the intermediate shaft 60 of which intermediate gear 56 is arranged slightly below and preferably laterally slightly offset with respect to the concentric shafts 50, 58. The second partial housing 94 comprises a section in which the angle drive shaft 62 is held. The angle drive shaft 62 is preferably arranged below the intermediate shaft 60 and is situated at the same height as the second driven axle 14.

FIG. 4 shows a sectioned view along the line IV-IV in FIG. 3.

A drive input element 100 is connected to a drive output shaft of the drive unit 16 or the cardan shaft 22. The drive input element 100 is rotationally fixedly connected by means of a claw clutch 102 to the input shaft 50 and is aligned concentrically with respect thereto. The claw clutch 102 has an elastomer damper element or a multiplicity of elastomer damper elements 104. Said elastomer damper elements 104 serve to dampen the activating arrangement 24 with respect to vibrations of the drive unit 16.

A first bearing 106 and a second bearing 107 are fixed to the first partial housing 92, on which first bearing 106 and second bearing 107 the input shaft 50 is rotatably mounted. Further bearings 108, 109 are provided in a region between the two partial housings 92, 94, on which further bearings 108, 109 the intermediate shaft 60 with the intermediate gear 56 is rotatably mounted. The angle drive shaft 62 is rotatably mounted on the second partial housing 94 by means of a bearing unit 110. The pinion 66 of the angle drive shaft 62 is part of a hypoid gear pair and meshes with the ring gear 68 which is likewise rotatably mounted on the partial housing 94, as described below.

Provided in the first partial housing 92 concentrically with respect to the input shaft 50 are the first and the second activating friction clutches 34, 36, with the second activating friction clutch 36 being arranged radially outside the first activating friction clutch 34, and the planetary gear set arrangement 52. The planetary gear set arrangement 52 is arranged between the activating friction clutches 34, 36 and the output element 54. Actuators (not shown in any more detail) for said friction clutches are provided between the activating friction clutches 34, 36 and an input-side wall of the first partial housing 92.

A plate carrier 112 is rotatably mounted on the input shaft 50 and forms an internal gear section which is connected to the sun gear 80 of the second planetary gear set 79. Secondly, the plate carrier 112 has a section which extends in the axial direction between the two activating friction clutches 34, 36 and which forms an input element for said two clutches. Outer plate carriers of the second activating friction clutch 36 are connected to the second partial housing 94. Inner plate carriers of the first activating friction clutch 34 are connected to the input shaft 50.

The gear set design of the planetary gear set arrangement 52 is identical to that in FIG. 2.

Furthermore, it can be seen in FIG. 4 that the bearing 110 for the angle drive shaft 62 is fixed by means of an adjusting disc 114 and a collar nut 118.

Figure 5:
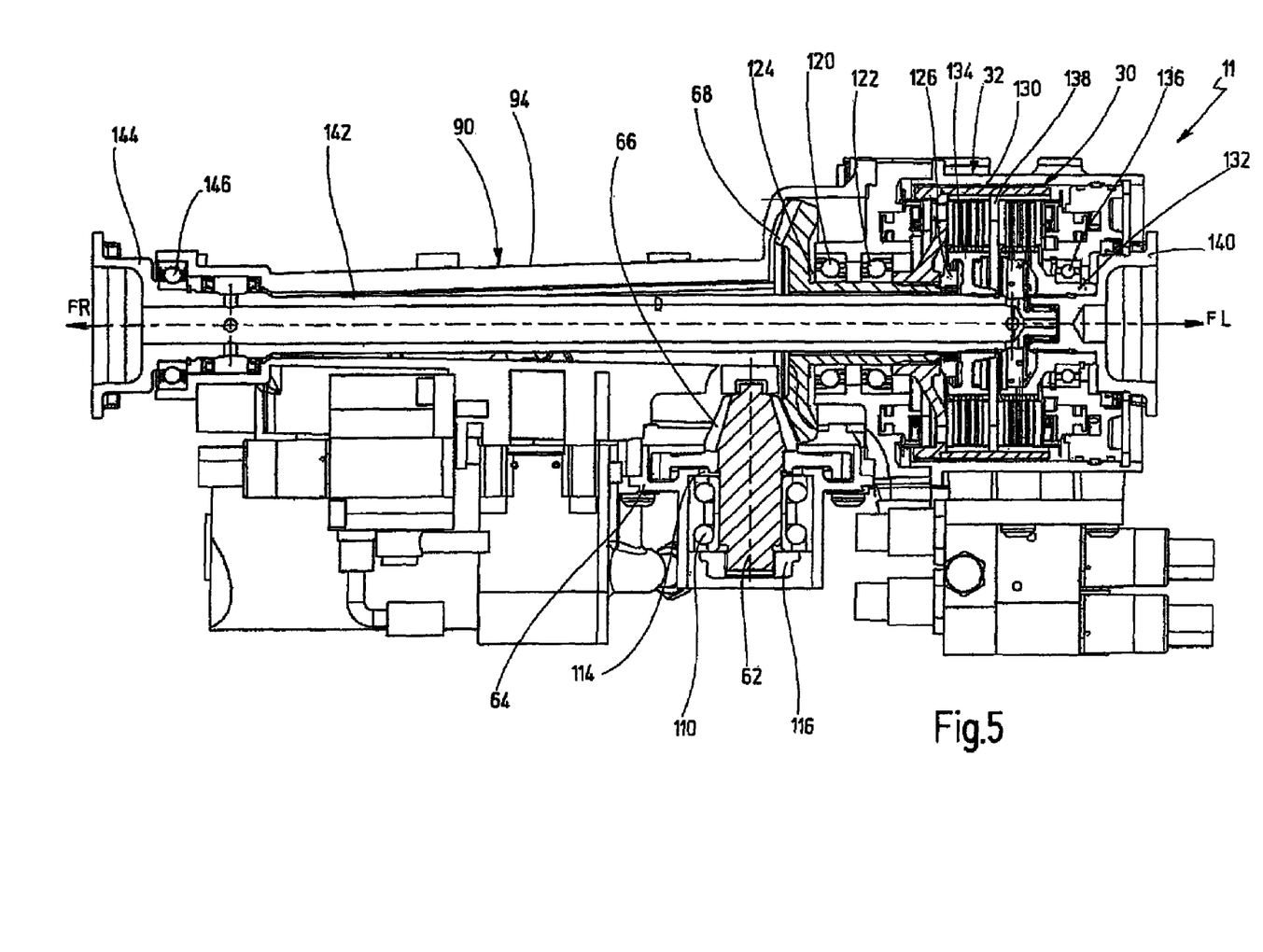
FIG. 5 shows a sectioned view along the line V-V in FIG. 3.

FIG. 5 shows a sectioned view along the line V-V in FIG. 3.

It is again possible to see the angle drive shaft 62 which is in engagement, by means of a hypoid toothing engagement, with the ring gear 68. The ring gear 68 has a central passage opening and a section which extends in the axial direction, by means of which section the ring gear 68 is rotatably mounted via two angular-contact ball bearings 120, 122 on the second partial housing 94.

The one angular-contact ball bearing 120 is supported on the ring gear 68 via an adjusting disc 124. A plate carrier 130 is arranged between the other angular-contact ball bearing 122 and a nut 126 for axially fixing the angular-contact ball bearings 120, 122. The plate carrier 130 is rotationally fixedly connected to the ring gear 68 and has an outer carrier section which forms a common input element for the two axle friction clutches 30, 32. The first axle friction clutch 30 is connected via an inner plate carrier 132 to a joint flange 140 which can be connected to a driveshaft for the left front wheel FL. Here, the inner plate carrier 132 is rotatably mounted on the second partial housing 94 by means of a bearing 136.

A heavy-duty securing ring is mounted between the two axle friction clutches 30, 32, against which securing ring the plates of the axle friction clutches 30, 32 can be supported in the axial direction.

An inner plate carrier 134 of the second axle friction clutch 32 is connected to a flange shaft 142 which extends through the ring gear 68 to an opposite end of the second partial housing 94 in the transverse direction 29. At said end, the flange shaft 142 is connected to a joint flange 144 which can be connected to a driveshaft for the right front wheel FR. Furthermore, the flange shaft 142 is rotatably mounted in said region on the second partial housing 94 by means of a bearing 146.

An actuator arrangement for actuating the two axle friction clutches 30, 32 is arranged on axially opposite sides of said clutches. The pistons which, for this purpose, are movable in the axial direction on the second partial housing 94 can be actuated by means of hydraulic actuators (not shown in any more detail in FIG. 5).

In the unpressurized state, the axle friction clutches 30, 32 are open, which increases the safety of the drivetrain 11. The activating friction clutches 34, 36, 42 and the axle friction clutches 30, 32 can be actuated by means of a common fluid supply, which preferably comprises a hydraulic clutch actuator with a pressure accumulator and various regulable valves. The electrical signals which are required for this purpose are generated by a control unit and are prepared by means of power stages. Said control unit performs at least the conversion of demanded clutch torque into a pressure demand to the clutch actuator or into individual electrical signals for setting said pressures. Temperature models of the clutches, which protect said clutches from thermal overloading, may be stored in the control unit.

One advantageous refinement of the drivetrain 11 provides that the transmission ratios which are assigned to the activating friction clutches 34, 36 are configured so as to be matched to the second and fourth forward gears of the multi-stage transmission 18 respectively. It is also preferable if, for this purpose, approximately 5% to 15%, in particular approximately 8% to 12% of advance of the plate carrier 130 in relation to a mean wheel speed at the front axle is generated, preferably by means of the selection of the transmission ratios (or by means of slip at least one friction clutch 30-42). In this way, it is possible for positive power to still be conducted in the direction of the wheel at the outside of the curve even in tight curves. If the vehicle is moved in the first or third gear of the multi-stage transmission 18, then the axle friction clutches 30, 32, when actuated, operate with a high degree of slip in order to conduct positive power to the corresponding front wheel FR or FL. For this purpose, active oil cooling is preferably provided for said axle friction clutches. Here, the oil is actively fed through the plate packs and through an oil cooler (not illustrated).

The drivetrain 11 according to the invention may also be used in primarily front-wheel-driven vehicles as well as in primarily rear-wheel-driven vehicles, with the second driven axle then forming the rear axle.

What is claimed is:

1. A drivetrain for an all-wheel-drive vehicle which has a first driven axle and a second driven axle, having a drive unit which is connected on one axial end to a multi-stage transmission which has a multiplicity of gear stages for generating different transmission ratios, with a transmission output shaft of the multi-stage transmission being connected to the first driven axle, with the drive unit being connected on its opposite axial end to an activating arrangement, wherein an output element of the activating arrangement is connected to the second driven axle, such that drive power can be supplied to the first axle permanently via the multi-stage transmission and drive power can be supplied to the second axle on demand via the activating arrangement, wherein the activating arrangement has a first activating friction clutch and a second activating friction clutch which are designed to supply drive power to the second axle via a first and a second transmission ratio stage respectively, with the first transmission ratio stage being assigned to at least one lower gear stage of the multi-stage transmission and with the second transmission ratio stage being assigned to at least one higher gear stage of the multi-stage transmission and wherein the activating arrangement has a third activating friction clutch which is designed to supply drive power to the second axle in the opposite rotational direction.

2. The drivetrain according to claim 1, wherein the activating arrangement has a planetary gear set arrangement for generating the first and the second transmission ratio stages.

3. The drivetrain according to claim 2, wherein the planetary gear set arrangement has a Ravigneaux-type planetary gear set arrangement with a first and a second planetary gear set which are arranged axially adjacent to one another.

4. The drivetrain according to claim 3, wherein the planetary gear sets have a common planet carrier.

5. The drivetrain according to claim 4, wherein the common planet carrier is connected to the output element of the activating arrangement, which is connected to the second axle.

6. The drivetrain according to claim 3, wherein the first planetary gear set has a sun gear which is connected to an input shaft of the activating arrangement.

7. The drivetrain according to claim 3, wherein the second planetary gear set has a sun gear which can be connected via the first activating friction clutch to an input shaft of the activating arrangement.

8. The drivetrain according to claim 7, wherein the sun gear of the second planetary gear set is mounted on a hollow shaft section on the input shaft of the activating arrangement.

9. The drivetrain according to claim 3, wherein the second planetary gear set has a sun gear which can be connected via the second activating friction clutch to a housing of the activating arrangement.

10. The drivetrain according to claim 3, wherein the first planetary gear set has a first sun gear, a first internal gear, a multiplicity of first planets which are mounted on a first planet carrier and which are in engagement with the first sun gear, and a multiplicity of stepped planets which are in engagement with the first planets and with the first internal gear.

11. The drivetrain according to claim 10, wherein the second planetary gear set has a second sun gear and a multiplicity of second planets which are mounted on a second planet carrier, and wherein the stepped planets of the first planetary gear set and the second planets of the second planetary gear set are connected to one another.

12. The drivetrain according to claim 3, wherein the second planetary gear set has a sun gear and a multiplicity of planets which are mounted on a planet carrier.

13. The drivetrain according to claim 1, wherein the first and the second activating friction clutches are designed so as to be nested radially one inside the other.

14. The drivetrain according to claim 1, wherein an input shaft of the activating arrangement is connected via a damping arrangement to the drive unit in a positively locking fashion.

15. The drivetrain according to claim 14, wherein the damping arrangement has a claw clutch with integrated damper means.

16. The drivetrain according to claim 15, wherein the claw clutch is permanently closed.

17. The drivetrain according to claim 1, wherein the activating arrangement has a housing which holds an input shaft, the activating friction clutches, a planetary gear set arrangement and the output element which is arranged concentrically with respect to the input shaft.

18. The drivetrain according to claim 17, wherein the housing also holds a device for distributing the power which is supplied via the activating arrangement to the second axle between the two wheels of the second axle.

19. The drivetrain according to claim 1, wherein the second driven axle has a first axle friction clutch and a second axle friction clutch which have a common input element and whose output elements are connected in each case to a driveshaft for a left-hand wheel and a right-hand wheel of the second axle, with it being possible for the first and the second axle friction clutches to be controlled independently of one another.

20. The drivetrain according to claim 19, wherein the two axle friction clutches are arranged on the same side, in the axle direction, in relation to an angle drive which connects the second axle to the activating arrangement.

21. The drivetrain according to claim 19, wherein the common input element is a common plate carrier.

22. The drivetrain according to claim 1, wherein the transmission ratios which are generated firstly by means of the activating friction clutches and secondly by means of the respectively associated gear stage of the multi-stage transmission are selected such that the rotational speed of the front axle is 5% to 15% higher than a reference rotational speed.

23. A drivetrain for an all-wheel-drive vehicle which has a first driven axle and a second driven axle, having a drive unit which is connected to a multi-stage transmission which has a multiplicity of gear stages for generating different transmission ratios, with a transmission output shaft of the multi-stage transmission being connected to the first driven axle, with the drive unit also being connected to an activating arrangement, wherein an output element of the activating arrangement is connected to the second driven axle, such that drive power can be supplied to the first axle permanently via the multi-stage transmission and drive power can be supplied to the second axle on demand via the activating arrangement, wherein the activating arrangement has a first activating friction clutch and a second activating friction clutch which are designed to supply drive power to the second axle via a first and a second transmission ratio stage respectively, with the first transmission ratio stage being assigned to at least one lower gear stage of the multi-stage transmission and with the second transmission ratio stage being assigned to at least one higher gear stage of the multi-stage transmission, wherein the activating arrangement has a planetary gear set arrangement for generating the first and the second transmission ratio stages, wherein the planetary gear set arrangement has a Ravigneaux-type planetary gear set arrangement with a first and a second planetary gear set which are arranged axially adjacent to one another, wherein the first planetary gear set has a sun gear, an internal gear, a multiplicity of planets which are mounted on a planet carrier and which are in engagement with the sun gear, and a multiplicity of stepped planets which are in engagement with the planets and with the internal gear, and wherein the internal gear of the first planetary gear set can be connected via a third activating friction clutch to a housing of the activating arrangement.

* * * * *